Aug. 24, 1926.
F. B. ENNIS
1,597,438
PNEUMATIC CONVEYER SYSTEM
Filed Feb. 18, 1925
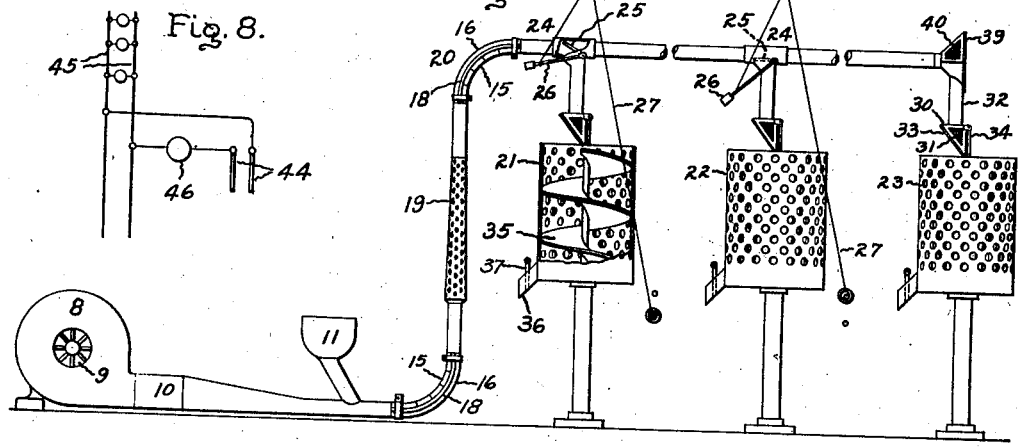
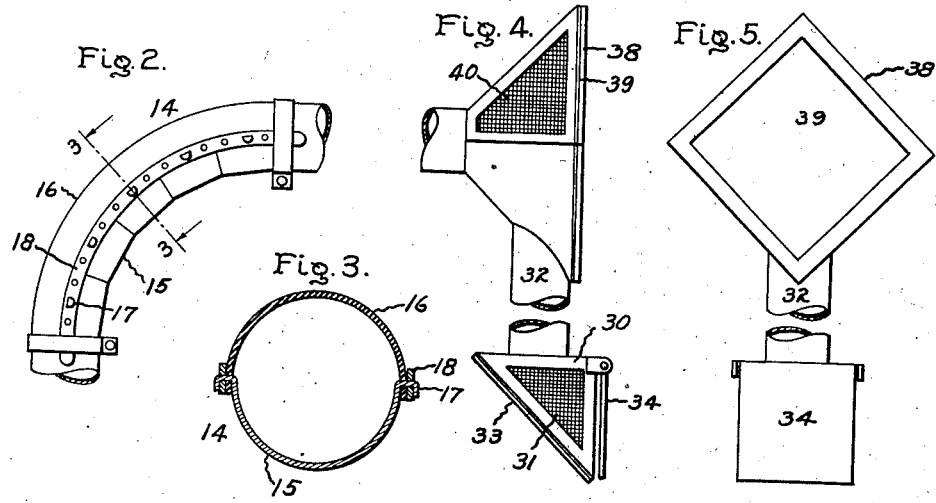
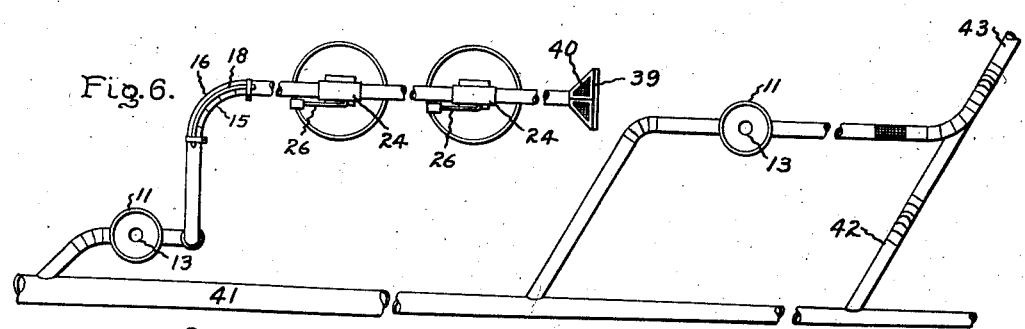
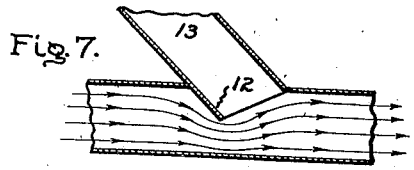
Inventor
Ford B. Ennis
by
His Attorney Patented Aug. 24, 1926.

1,597,438

UNITED STATES PATENT OFFICE.

FORD B. ENNIS, OF BRIDGEPORT, CONNECTICUT, ASSIGNOR TO GENERAL ELECTRIC COMPANY, A CORPORATION OF NEW YORK.

PNEUMATIC CONVEYER SYSTEM.

Application filed February 18, 1925. Serial No. 10,089.

The present invention relates to conveyer systems of the type wherein a current of air is utilized to convey small objects through a conduit from one place to another. For many purposes such systems are very simple and present no difficulties. Where, however, they are used for conveying thin walled metal objects and particularly light hollow ones, which are easily bent, dented or otherwise injured, such as the shells for incandescent lamp sockets, screw shells, socket caps, shells for attachment plugs, etc., considerable difficulties are experienced and which it is the purpose of my present invention to overcome.

For a consideration of what I believe to be novel and my invention, attention is directed to the accompanying description and the claims appended thereto.

In the drawing, Fig. 1 illustrates in a more or less diagrammatic manner a pneumatic conveyer system; Fig. 2 is a detail view of one of the elbows in the piping system; Fig. 3 is a section taken on line 3—3 of Fig. 2; Fig. 4 is a detail view in side elevation of one of the discharging devices; Fig. 5 is a front view of the same; Fig. 6 is a more or less diagrammatic view of my improved system showing boosters for the air pressure; Fig. 7 is a detail view in section of the means for introducing articles into the piping system; and Fig. 8 is a diagram of an indicating device.

8 indicates a centrifugal fan or blower designed to deliver a large volume of air at relatively low pressure and high velocity. I have found a commercial blower designed to deliver about 2200 cubic ft. of air per minute at a pressure of about 1½ to 2 ounces satisfactory for the purpose. It may be driven by any suitable means such as an electric motor. 9 indicates the eye of the casing through which air is admitted and 10 the outlet or discharge conduit. The light metal articles to be conveyed are fed into the hopper 11 and from there enter the piping system connected with the fan outlet. The articles are preferably fed into the hopper one at a time and usually in rapid succession. Generally the hopper will receive the articles from the machine which make them or one which performs some operation thereon. Two or more hoppers, duplicates of the one shown, may be provided if desired in the same system, as shown in Fig. 6. A reasonable rate of speed for feeding the articles in question without causing congestion or injury is 110 per minute. I have used these figures as illustrations and not as limitations. The main thing is to feed the articles as rapidly as may be desired but not so rapidly that one article will strike the other while in transit for to do so may cause injury to one or both of the contacting articles.

In order to keep the air from blowing upwardly through the hopper a baffle 12 is provided, Fig. 7, which causes compression of the air as it flows past the point or region of greatest restriction, the arrangement being such that the expansion of the air does not take place until after the opening 13 communicating with the hopper is past. To state the matter in other words the baffle 12 causes a reduction of air pressure to that of the atmosphere or even slightly below it so that articles dropped into the hopper will fall into the air stream and be conveyed by it to the points of discharge.

Articles such as shells for incandescent lamps are very thin and have external surfaces which must be finished very smooth to meet the requirements of the trade. Owing to their comparatively fragile construction great care must be exercised to see that they are not injured while passing through the piping system. In order to get the articles moving from the point of reception to the conveyer pipes a certain amount of pressure is required and a considerable volume of air. If the pressure is too high the various bends in the piping system, discharging devices, etc. will cause injury to the surfaces of the articles being conveyed. To prevent injury to the articles at the bends or elbows of the piping system yielding means are provided to cushion their movements. A means suitable for the purpose is shown in Figs. 2 and 3 wherein 14 indicates an elbow, the inner half 15 of which is made of thin sheet metal and the outer half 16 of rubber. The kind of rubber used in making inner tubes for pneumatic tires is satisfactory for the purpose. The sides of the portion 15 are provided with tongues 17 which pass through the rubber and through a curved metal strip 18 after which they are bent over to hold the parts in place. As the thin walled articles strike the rubber they are deflected in the proper direction and owing to the nature of the surface their movements are slightly retarded. Having gotten the articles into motion the next thing is to retard them sufficiently so that they will not strike the next bend or elbow in the system with undue force or be delivered with too great force into the containers. I have found by experience that this may be done by providing means for releasing a considerable volume of air at a region preceding and quite near the bend or container. A suitable means for the purpose to be located adjacent the bends is shown at 19, Fig. 1 and comprises a slightly cone-shaped perforated pipe or member which forms a part of the conveyer or piping system. This member somewhat resembles a part of a Venturi tube. When in service only a very small amount of air escapes through the lower perforations, the amount increasing toward the upper end at which point it reaches the maximum. This release of a substantial volume of air has the effect of decreasing the speed of the rapidly moving objects sufficiently to prevent injury thereto as they strike the bend 20 in the pipe system. 21, 22 and 23 indicate suitably spaced containers and they are stationed at places convenient to the machines in which further operations are to be carried on or at the end of the system where finished articles are delivered. Some of the containers may be in one building and one or more in an adjacent building as is the case in one installation which I have made. At 24 is indicated a device commonly referred to as a "valve" by means of which the articles may be directed into one or another of the containers. Each comprises a pivoted member 25, a weighted arm 26 and a controlling means 27 such as a cord and pulley, one end of the cord being a handle conveniently located with respect to the operator. When the member 25 is elevated at its free end as shown at the left all of the articles will be delivered to the first container. After a sufficient number has been accumulated therein the member is permitted to drop and occupy a horizontal position after which the articles will be conveyed to the second or third container as the case may be. In order to prevent the articles from injuring themselves due to striking a fixed object when in rapid movement, an air-releasing device is provided adjacent to but preceding the container. A satisfactory means for the purpose is shown at the lower ends of Figs. 4 and 5. It comprises a frame work 30 of triangular shape in elevation, the sides of which are formed by fine mesh wire netting 31 through which the air is free to escape. The upper face is made of sheet metal and is affixed to the vertical tube 32. The inclined wall 33 is made of rubber similar to that used in the elbows and as the articles fall they strike it. 34 indicates a hinged door at the front of the device which may be made of rubber or other non-metallic substance which will not injure the articles as the latter strike it. The articles themselves cause the door to open and when so opened the articles fall into the containers. The containers, at least for some purposes, are designed to contain several thousand articles. This means that each container must be of considerable size. For some purposes they may be of the order of four feet in diameter and five feet high. In order to prevent the articles from being injured after passing through the door 34, as they would if the container were empty or only partly filled, each container is provided with a spiral track 35 down which the articles roll from the top. Suitable means such as a chute 36 and a gate 37 are provided to remove the articles from the container. For some classes of work the gate and chute may be so constructed and arranged as to feed the articles out one at a time while, in other cases they may be fed out in quantities. The containers have perforations of substantial size through which the contents may be observed.

At the outer end of the piping system I provide a releasing device for all or practically all of the compressed air. A suitable means for this purpose is shown at the upper ends of Figs. 4 and 5. It comprises a frame work 38 which supports a sheet of rubber 39 that acts as a stop or buffer. After the articles strike the rubber sheet they drop by gravity. The sides of the frame are provided in their upper parts with fine mesh wire netting 40 through which the air flows freely, any air not escaping at this point does so at the bottom of the tube 32 through the wire netting 31. It is evident that this air-releasing device must be at or near the end of the system because dependence is placed on the air stream to move the articles and hence the air must not be dissipated until after it has done its work.

As before intimated there is no difficulty in blowing light articles through the conduit or piping systems, and for these pipes ordinary galvanized or other sheet metal pipe is satisfactory, the problem is to prevent injury at different points in the system. This I have done by providing air-releasing means at what may be termed the critical points, i. e. the bends or elbows and where the articles are discharged. As a result of this the articles can not be carried any great distance if there are many containers to be fed without augmenting the air supply at one or more points. I meet this condition by providing a "booster" such as is illustrated in Fig. 6. In this figure 41 indicates a trunk pipe properly porportioned throughout its length to convey as much air as desired from the blower. In this pipe are various taps leading from the hoppers 11 through which the articles are fed. In addition a booster pipe 42 is provided leading from the trunk pipe and supplying air in large volume and low pressure to the conduit 43 which for example may be the one leading to another building or to a remote station and through which the articles are conveyed. It is desirable to supply this "boosting" air through a jet device or nozzle so arranged as to be out of the path of the moving articles.

When one of the large containers is located at a considerable distance from the source of supply of the articles, it is desirable to have an automatic indicator to show when the container is filled. A simple arrangement for the purpose comprises a pair of normally separated contacts 44, Fig. 8, which are suitably supported in the container and insulated from each other. In circuit therewith is a source of electric energy such as the factory lighting mains 45 and a telltale lamp 46 located at or near the source of supply of the articles. Since the articles are made of metal when the container is filled to the desired level one or more of them will bridge the contacts 44 and complete the circuit of the telltale lamp 46, thus indicating the fact to the operator who is feeding the articles to the system.

Due to the simplicity of the arrangement and to the fact that the piping system is located overhead it can readily be installed in existing plants without changing the arrangement of the machines used in the manufacture of the articles, or at least with very slight change in the arrangement. The fact that the piping system is made of sheet metal means that the initial cost is low. The air-releasing devices are simple and inexpensive to construct and the rubber parts are easily replaced when worn, thus reducing the cost of maintenance to a minimum.

Although my improved system is designed for light metal articles it can be used for non-metallic articles of a fragile nature.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a pneumatic conveyer conduit through which light fragile articles are carried by air currents, and spaced containers into which said conduit is adapted to discharge said articles, said conduit having bends along its length, of means for preventing injury to the articles while passing the bends and while being discharged, said means comprising an air releasing device connected with the conduit adjacent and preceding each bend, an air releasing device connected with the conduit adjacent and preceding each container, and a device in each container for retarding movement of articles discharged therein.

2. The combination with a pneumatic conveyer conduit through which light fragile articles are carried by air currents, and spaced containers into which said conduit is adapted to discharge said articles, said conduit having bends along its length, of means for preventing injury to the articles while passing the bends and while being discharged, said means comprising an air releasing device connected with the conduit adjacent and preceding each bend, a flexible member in each conduit bend forming the outer wall portion thereof, an air releasing device connected with the conduit adjacent and preceding each container, said last-named device having a flexible wall associated therewith against which the articles strike, and a device in each container for retarding movement of articles discharged therein.

3. The combination with a pneumatic conveyer conduit through which light fragile articles are carried by air currents, and spaced containers into which said conduit is adapted to discharge said articles, said conduit having bends along its length, of means for preventing injury to the articles while passing the bends and while being discharged, said means comprising a perforated conduit section forming part of the conveyer conduit, a flexible member in each conduit bend forming the outer wall portion thereof, an air releasing device connected with the conduit adjacent and preceding each container, said last-named device having a flexible wall associated therewith against which the articles strike, and a spiral track in each container for retarding movement of articles discharged therein.

4. In a pneumatic system for conveying light, fragile articles, the combination of a piping system, means for supplying air thereto in sufficient volume to cause the articles to be be conveyed therethrough at considerable speed, means for feeding the articles to the system, spaced containers for the articles, means preceding the containers for releasing substantial amounts of air from the system to decrease the speed of the articles, and means following the outlet to a container for augmenting the supply of air to the system.

5. In a pneumatic system for conveying light, fragile articles, the combination of a piping system having bends therein, means for supplying air thereto in relatively large volume and low pressure, means preceding the bends for releasing substantial amounts of air from the system for reducing the speed of the articles, a container for the articles, and means preceding the container for releasing substantially all of the air in that region of the piping so that the articles may drop by gravity into the container.

6. In a pneumatic system for conveying light, fragile articles, the combination of a piping system having bends therein, means for supplying air thereto in relatively large volume and low pressure, means preceding the bends for releasing substantial amounts of air from the system for reducing the speed of the articles, a container for the articles, means preceding the container for releasing substantially all of the air in that region of the piping so that the articles may drop by gravity into the container, and a yielding means associated with the last-named air-releasing means against which the articles strike.

In witness whereof, I have hereunto set my hand this 14th day of February, 1925.

FORD B. ENNIS.